US008924408B2

(12) United States Patent
Brown et al.

(10) Patent No.: US 8,924,408 B2
(45) Date of Patent: *Dec. 30, 2014

(54) AUTOMATIC GENERATION OF DATABASE INVOCATION MECHANISM FOR EXTERNAL WEB SERVICES

(75) Inventors: Larry Brown, Austin, TX (US); James C. Kleewein, San Jose, CA (US); Rong Qu, Austin, TX (US); Berthold Reinwald, Los Gatos, CA (US); Peter M. Schwarz, San Jose, CA (US); Charles Daniel Wolfson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2068 days.

This patent is subject to a terminal disclaimer.

(21) Appl. No.: 09/967,553

(22) Filed: Sep. 28, 2001

(65) Prior Publication Data

US 2004/0199636 A1    Oct. 7, 2004

(51) Int. Cl.
*G06F 17/30* (2006.01)

(52) U.S. Cl.
CPC .................................. *G06F 17/3089* (2013.01)
USPC ......................................................... 707/760

(58) Field of Classification Search
USPC ........................................... 707/10, 702, 760
See application file for complete search history.

(56) References Cited

U.S. PATENT DOCUMENTS

| 5,504,886 | A |  | 4/1996 | Chang et al. |
| 5,634,127 | A |  | 5/1997 | Cloud et al. |
| 5,689,698 | A |  | 11/1997 | Jones et al. |
| 5,826,239 | A |  | 10/1998 | Du et al. |
| 5,884,312 | A |  | 3/1999 | Dustan et al. |
| 5,956,483 | A |  | 9/1999 | Grate et al. |
| 5,960,420 | A |  | 9/1999 | Leymann et al. |
| 6,003,011 | A |  | 12/1999 | Sarin et al. |
| 6,006,235 | A |  | 12/1999 | Macdonald et al. |
| 6,012,067 | A | * | 1/2000 | Sarkar .................................. 1/1 |
| 6,029,163 | A |  | 2/2000 | Ziauddin |
| 6,058,393 | A |  | 5/2000 | Meier et al. |
| 6,067,542 | A |  | 5/2000 | Carino, Jr. |
| 6,094,649 | A |  | 7/2000 | Bowen et al. |
| 6,317,786 | B1 |  | 11/2001 | Yamane et al. |
| 6,324,683 | B1 |  | 11/2001 | Fuh et al. |
| 6,338,056 | B1 |  | 1/2002 | Dessloch et al. |
| 6,418,448 | B1 |  | 7/2002 | Sarkar |

(Continued)

OTHER PUBLICATIONS

UDDI (Universal Description, Discovery and Integration) Standard and Initiative; Matthew J. Dovey; Jun. 2001.*

(Continued)

*Primary Examiner* — Christyann Pulliam
*Assistant Examiner* — Melissa M. Ohba
(74) *Attorney, Agent, or Firm* — David W. Victor; Konrad, Raynes, Davda & Victor LLP

(57) ABSTRACT

An external service at a service provider server is invoked from a database by accessing from over a network a description of the external service published by the service provider external to the database. A database invocation mechanism is generated from the accessed description of the external service, wherein the database invocation mechanism comprises code within the database. A database program invokes the database invocation mechanism code within the database to invoke and interact with the external service. The database receives data from the external service in response to invoking and interacting with the external service.

48 Claims, 10 Drawing Sheets

(56) References Cited

U.S. PATENT DOCUMENTS

| | | |
|---|---|---|
| 6,434,619 B1 | 8/2002 | Lim et al. |
| 6,457,066 B1 | 9/2002 | Mein et al. |
| 6,460,041 B2 | 10/2002 | Lloyd |
| 6,560,633 B1 | 5/2003 | Roberts et al. |
| 6,574,673 B1 | 6/2003 | Hari et al. |
| 6,591,295 B1 * | 7/2003 | Diamond et al. ............ 709/217 |
| 6,732,089 B1 | 5/2004 | Sinn |
| 6,741,997 B1 | 5/2004 | Liu et al. |
| 6,745,332 B1 | 6/2004 | Wong et al. |
| 6,792,605 B1 | 9/2004 | Roberts et al. |
| 6,820,267 B2 | 11/2004 | Christensen et al. |
| 6,910,070 B1 | 6/2005 | Mishra et al. |
| 6,910,216 B2 | 6/2005 | Abileah et al. |
| 6,961,760 B2 | 11/2005 | Li et al. |
| 6,978,261 B2 | 12/2005 | Cotner et al. |
| 6,985,939 B2 | 1/2006 | Fletcher et al. |
| 6,996,574 B2 | 2/2006 | Gluckman |
| 7,103,590 B1 | 9/2006 | Murthy et al. |
| 7,107,597 B2 | 9/2006 | Shappir et al. |
| 7,120,703 B2 | 10/2006 | Li et al. |
| 7,155,426 B2 | 12/2006 | Al-Azzawe |
| 7,165,113 B2 | 1/2007 | Karp et al. |
| 2002/0016814 A1 | 2/2002 | Convent et al. |
| 2002/0038450 A1 | 3/2002 | Kloppmann et al. |
| 2002/0073089 A1 | 6/2002 | Schwartz et al. |
| 2002/0120685 A1 | 8/2002 | Srivastava et al. |
| 2002/0120704 A1 | 8/2002 | Karp et al. |
| 2002/0143819 A1 * | 10/2002 | Han et al. ....................... 707/513 |
| 2002/0156688 A1 | 10/2002 | Horn et al. |
| 2002/0184219 A1 * | 12/2002 | Preisig et al. ................... 707/10 |
| 2002/0188761 A1 | 12/2002 | Chikirivao et al. |
| 2003/0004746 A1 * | 1/2003 | Kheirolomoom et al. ........ 705/1 |
| 2003/0061404 A1 * | 3/2003 | Atwal et al. ................... 709/328 |
| 2003/0093436 A1 | 5/2003 | Brown et al. |
| 2003/0126109 A1 | 7/2003 | Couch et al. |
| 2003/0191769 A1 | 10/2003 | Crisan et al. |
| 2004/0205772 A1 * | 10/2004 | Uszok et al. ................... 719/317 |
| 2004/0213409 A1 * | 10/2004 | Murto et al. ................... 380/258 |
| 2005/0093881 A1 | 5/2005 | Okita et al. |

OTHER PUBLICATIONS

UDDI XML.org; http://uddi.xml.org/about; 2007.*
"Business Explorer for Web Services"; http://www.alphaworks.ibm.com/tech/be4ws; Dec. 3, 2001.*
UDDI Techincal White Paper; uddi.org; Sep. 6, 2000.*
F. Curbera et al., "Using WSDL in a UDDI Registry 1.05", Jun. 25, 2001, UDDI Working Draft Best Practices Document, http://www.uddi.org/pubs/wsdlbestpractices-V1.05-Open-20010625.pdf; pp. 1-9.
T. Bellwood et al., "UDDI Version 2.0 API Specification", Jun. 8, 2001, UDDI Open Draft Specification; http://www.uddi.org/pubs/ProgrammersAPI-V2.00-Open-20010608.pdf: , ppl-81.
Christensen, E., F. Curbera, G. Meredith, & S. Weerawarana, "Web Services Description Language (WSDL) 1.1", W3C Note, [online], Mar. 15, 2001, Retrieved from the Internet at <URL: http://www.w3.org/TR/2001/NOTE-wsdl-200103015>, 49 pp.
Cutlip, R., "Web Services: The New Web Paradigm", DB2 Magazine, Quarter 4, vol. 6, Iss. 4, [online], 2001, [Retrieved on Jan. 16, 2007], Retrieved from the Internet at <URL: http://www.db2mag.com/db_area/archives/2001/q4/cutlip/shtml>, 13 pp.
Grundgeiger, D., A. Goldade, & V. Fugman, "SQL and XML: Use XML to Invoke and Return Stored Procedures Over the Web", [online], (Aug. 2001), [retrieved on Jan. 15, 2007], Retrieved from the Internet at <URL: http:// msdn.microsoft.com/msdnmag/issues/01/08/XMLSQL/print.asp>, 17 pp.
Gudgin; M., M. Hadley, J. Moreau, & H.F. Nielsen (Eds.), "SOAP Version 1.2", W3C Working Draft, [online], Jul. 9, 2001, Retrieved from the Internet at <URL: http://www.w3.org/TR/2001/WD-soap12-20010709>, 62 pp.
Gudgin, M., M. Hadley, N. Mendelsohn, J. Moreau, & H.F. Nielsen, "SOAP Version 1.2 Part 1: Messaging Framework", W3C Candidate Recommendation, [online], Dec. 19, 2002, Retrieved from the Internet at <URL: http://www.w3.org/TR/soap12-part1/>, 44 pp.
IBM Corporation, "DB2 XML Extender", [online], [Retrieved on or before Sep. 28, 2001], retrieved from the Internet at <URL: http://www.ibm.com/software/data/db2/extenders/xmlext/>.
Kao, J., "Developer's Guide to Building XML-based Web Services with the Java 2 Platform, Enterprise Edition (J2EE)", The Middleware Company, Jun. 2001, 20 pp.
Leymann, F., "Web Services Flow Language (WSFL 1.0)", May 2001, 108 pp.
Oasis, "Simple Object Access Protocol (SOAP)", Technology Reports, [online], Jul. 2003 [retrieved on Jan. 16, 2007], Retrieved from the Internet at <URL: http://www.oasis-open.org/cover/soap.html>, 62 pp.
Ogbuji, U., "Using WSDL in SOAP Applications", [online], Nov. 1, 2000, [Retrieved on Jan. 16, 2007], retrieved from the Internet at <URL: http://www-128.ibm.com/developerworks/library/ws-soap/?dwzone=components>, 7 pp.
Rutledge, S.H. & S. Medicke, "Database Integration With DB2 Relational Connect: Building Federated Systems with Relational Connect and Database Views", 2001, 33 pp.
Silberschatz, A., P. Galvin, & G. Gagne, "Applied Operating System Concepts", First Edition, 2000, 18 pp.
Snell, J., "The Web Services Insider, Part 4: Introducing the Web Services Flow Language", [online], Jun. 2001, Retrieved from the Internet at <URL: http://www-106.ibm.com/developerworks/library/ws-ref4-index.html>, 7 pp.
Sybase, Inc., "What is AI for Stored Procedures", [online], 2001, [Retrieved on Jan. 16, 2007], Retrieved from the Internet at <URL: http://awebproxyprd.ins.state.ny.us/docs/aispref/aiprocp3.htm>, 2 pp.
Workman, D.D., "A Guide for Writing Sybase Stored Procedures for the World Wide Web", [online], Mar. 29, 1998, [Retrieved on Jan. 16, 2007], Retrieved from the Internet at <URL: http://sybernet.sri.com/guide.html>, 67 pp.
Zou, Y., & K. Kontogiannis, "Web-Based Specification and Integration of Legacy Services", Proceedings of the 2000 Conference of the Centre for Advanced Studies on Collaborative Research, 2000, 17 pp.
IBM Corporation, "DB2 XML Extender", [online], Jun. 19, 2001, [Retrieved on Mar. 1, 2007], retrieved from the Internet at <URL: http://www-4.ibm.com/software/data/db2/extenders/xrnlext/>.
Jaworski, J., "JAVA 1.1: Developer's Guide Second Edition", Second Edition, Sams.net Publishing, 1997, Chapter 19, 21 pp.
Cocreate Software et al., "Workflow Management Facility Convenience Document Combining dtc/99-07-05 dtc/2000-02-03 (WF RTF 1.3 Report)", OMG Document Number: dtc/2000-02-05, Feb. 14, 2000, 95 pp.
Workflow Management Coalition, "Workflow Management Application Programming Interface (Interface 2 & 3) Specification", Document No. WFMC-TC-1009, Version 2.0, Jul. 1998, 171 pp.
Workflow Management Coalition, "Workflow Management Coalition Interface 1: Process Definition Interchange Process Model", Document No. WFMC-TC-1016-P, Version 1.1, Oct. 29, 1999, 100 pp.
Cheng, J. and J. Xu, "IBM DB2 XML Extender: An End-to-End Solution for Storing and Retrieving XML Documents", Proceedings of the 16th International Conference on Data Engineering, Feb. 2000, 16 pp.
Huang, L., A. Akram, D.W. Walker, R.J. Allan, O.F. Rana, and Y. Huang, "A Workflow Portal Supporting Multi-Language Interoperation and Optimisation", Concurrency and Computation: Practice and Experience, 2000, pp. 1-10.
IBM Corporation, "DB2 Universal Database XML Extender: Web-Enabling Your Data with XML", 2000, 2 pp.
Newport, B., "Requirements for Building Industrial Strength Web Services: The Service Broker", [online], Jul. 2001, [retrieved on Apr. 25, 2007], retrieved from the Internet at <URL: http://www.theserverside.com/tt/articles/content/service-broker/article.html>, 14 pp.
Snell, J., "Web Services Insider, Part 7: WSFL and Recursive Composition", [online], Jul. 1, 2001, [Retrieved on Apr. 25, 2007], retrieved from the Internet at <URL: http://www.128.ibm.com/developerworks/webservices/library/ws-reff>, 6 pp.

(56) References Cited

OTHER PUBLICATIONS

Tapang, C.C., "Soap Toolkit 2.0: New Definition Languages Expose Your COM Objects to SOAP Clients", [online], updated Dec. 17, 2004, [retrieved on Apr. 26, 2007], retrieved from the Internet at <URL: http://msdn.microsoft.com/msdnmag/issues/01/04/Toolkit20/print.asp>, 8 pp.

Atzenberger, B. and M. Bender, "Data Warehouse Performance Enhancements with Oracle9i", Oracle White Paper, Apr. 2000, 36 pp.

Bonifati A. , S. Ceri, and S. Paraboschi, "Active Rules for XML: A New Paradigm for E-services", The VLDB Journal, vol. 10, No. 1, Aug. 2001, pp. 39-47.

Colan, M., "Dynamic E-business: Using Web Services to Transform Business", [online], Jun. 2001, [Retrieved on Oct. 8, 2007], retrieved from the Internet at <URL: http://www.cs.mu.oz.au/~eas/subjects/654/wsintro.pdf>, 15 pp.

Duftler, M.J., N.K. Mukhi, A. Slominski, and S. Weerawarana, "Web Services Invocation Framework (WSIF)", IBM, Aug. 9, 2001, pp. 1-9.

Fan, M., J. Stallaert, and W.B. Whinston, "A Web-Based Financial Trading System", Computer, vol. 32, Iss. 4, 1999, pp. 64-70.

IBM Corp, "Web Services Object Runtime Framework: Implementing Web Services with XML Extender, Version 7.2 (Beta)", [online], First Edition, Jul. 2001, [Retrieved on Oct. 8, 2007], Retrieved from the Internet at <URL: http://www-306.ibm.com/software/date/db2/extenders/xmlext/docs/v72wrk/dxxservl.htm>, 61 pp.

Kreger, H., "Web Services Conceptual Architecture (WSCA 1.0)", IBM White Paper, 2001, 40 pp.

Lambros, P., M. Schmidt, and C. Zentner, "Combine Business Process Management Technology and Business Services to Implement Complex Web Services", IBM WEB Services, May 2001, pp. 1-27.

Manes, A.T., "Enabling Open, Interoperable, and Smart Web Services: The Need fro Shared Context", [online], Mar. 2001, [Retrieved on Oct. 8, 2007], retrieved from the Internet at <URL: http://www.w3.org/2001/03/WSWS-popa/paper29>, 7 pp.

Mckoi, "Mckoi SQL Database-Version History", [online], Updated Aug. 2004, [Retrieved on Oct. 11, 2007], retrieved from the Internet at <URL: http://www.mckoi.com/database/history.html>, 23 pp.

Oracle Corp, "SQL, PL/SQL, and Java", [online], Oracle9i Database Concepts, Release 1 (9.0.1), Part No. A88856-02, 2001, [retrieved on Oct. 11, 2007], retrieved from the Internet at <URL: http://download-uk.oracle.com/docs/cd/A91202_01/901_doc/server.901/a88856/c16sqlpl . . . >, 35 pp.

Price, J., "Using Static and Synamic SQL in SQLJ", [online], Aug. 9, 2001, [retrieved on Oct. 11, 2007], retrieved from the Internet at <URL: http://www.oreillynet.com/lpt/a/2068>, 8 pp.

Saganich, A., "Java and Web Services Primer", [online], Aug. 7, 2001, [retrieved on Feb. 17, 2008], retrieved from the Internet at <URL: http://www.onjava.com/lpt/a/1025>, 7 pp.

White, W.W., "Java UDRs with Embedded SQL", [online], Jan 1, 2001, [retrieved on Oct. 11, 2007], retrieved from the Internet at <URL: http://www.ibm.com/developerworks/db2/zones/informix/library/samples/db_sqlj.html>, 7 pp.

Xu, J., and J. Chang, "Enabling Your Business Data for XML with DB2 XML Extender", Feb. 2000, 29 pp.

Decision on Appeal, Jun. 2, 2011, for U.S. Appl. No. 09/968,353, Total 9 pp.

\* cited by examiner

XML document with default tagging 39

```
<simpleQueryRow>
<ORDER_KEY>1</ORDER_KEY>
<CUSTOMER_NAME>American Motors</CUSTOMER_NAME>
<CUSTOMER_EMAIL>parts@am.com</CUSTOMER_EMAIL>
<CUSTOMER_PHONE>800-AM-PARTS</CUSTOMER_PHONE>
</simpleQueryRow>
. . .
```

Rows and columns returned with default XML tagging 38

FIG. 5

DADX 51

```
<?xml version="1.0"?>
<DADX xmlns="urn:ibm.com:dadx".....>
.
<SQL_call>CALL Myproc(:query1, :query2, :query3)</SQL_call>

<SQL_query>select * from order_tab
...
</SQL_query>

<SQL_update>insert into order_tab
...
</SQL_update>

<retrieveXML>
    <DAD_ref>getstart_xcollection.dad</DAD_ref>
    <SQL_override>
    select o.order_key, customer_name, customer_email...
    </SQL_override>
</retrieveXML>
```

Web Services Architecture

Step 1: Browse on-line catalog

Fig. 9
Step 2: Find Supplies
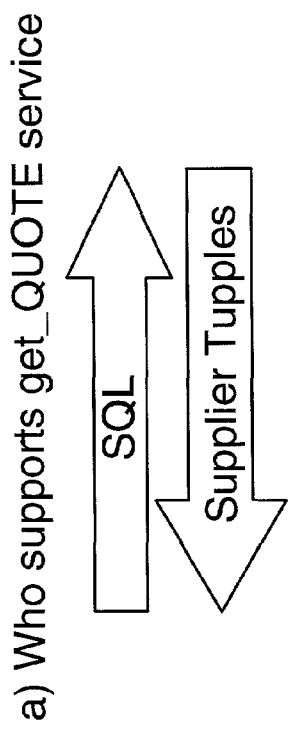
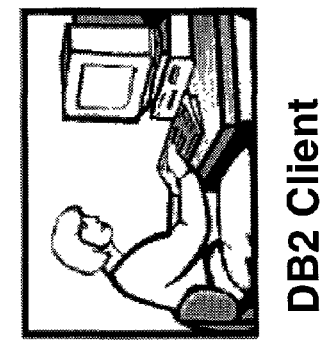
a) Who supports get_QUOTE service
SQL / Supplier Tupples
DB2 Client
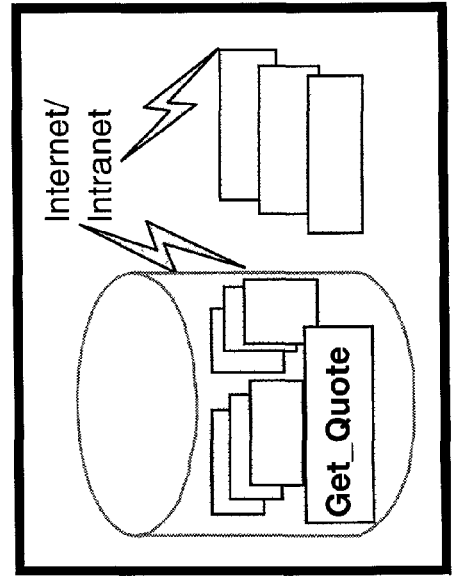
b) Find a Get_Quote service desc.
Query XRR / wsdl

AUTOMATIC GENERATION OF DATABASE INVOCATION MECHANISM FOR EXTERNAL WEB SERVICES

RELATED APPLICATIONS

The present invention is related to commonly assigned U.S. patent application Ser. No. 09/968,353 to Brown et al., entitled "Invocation of Web Services from a Database", filed concurrently herewith on Sep. 28, 2001. It is also related to commonly assigned pending U.S. patent application Ser. No. 09/871,475 to Preisig et al., entitled "System, Method and Computer Program Product for Reformatting Non-XML Data for Use with Internet Based Systems", filed May 31, 2001.

FIELD OF THE INVENTION

The present invention relates generally to the invocation of web services, and more particularly to automatic generation of database invocation mechanism for external web services.

BACKGROUND OF THE INVENTION

Web services are an emerging technology that offers the dual promise of simplicity and pervasiveness. Web services represent the next level of function and efficiency in e-business. In the most primitive sense, Web services can be viewed as any mechanism by which an application service may be provided to other applications on the internet.

Web services may be informational or transactional. That is, some services provide information of interest to the requestor while other services may actually lead to the invocation of business processes. Examples of publicly available Web services today include stock quote services, services to retrieve news from Web news sources, and currency conversion services.

Because Web services are modular, related Web services can be aggregated into a larger Web service. For example, one can envision a wireless application composed of separate Web services that do such things as obtaining stock quotes, subscribing to news services, converting currency, and managing calendars. One particularly nice aspect of Web services is that the level of abstraction they provide makes it relatively simple to wrap an existing enterprise application and turn it into a Web service.

Web services provide a way to make key business processes accessible to customers, partners, and suppliers. For example, an airline could provide its airline reservation systems as a Web service to make it easier for its large corporate customers to integrate the service into their travel planning applications. A supplier can make its inventory levels and pricing accessible to its key buyers. This emerging technology enables e-business applications to be connected more easily both inside and outside the enterprise.

Web services are based on the extensible Markup Language (XML) standard data format and data exchange mechanisms, which provide both flexibility and platform independence. With Web services, requesters typically do not know or care about the underlying implementation of Web services, making it easy to integrate heterogeneous business processes.

One example of web-services are the services responsive to messages contained in Simple Object Access Protocol (SOAP) envelopes. SOAP is an application invocation protocol developed by IBM, Microsoft, and others that defines a simple protocol for exchanging information encoded as XML messages. It is more fully described in the working draft of SOAP version 1.2, available at Http://www.w3.org/2000/xp/, (referenced as Appendix A) appended hereto and incorporated by reference herein. Often, the services are described by WSDL (Web Service Description Language) notation stored in WSDL documents. WDSL is described in the Web Services Description Language 1.1 document, available at http://www.w3.org/TR/wsdl, (referenced as Appendix B) appended hereto and incorporated by reference herein. A WSDL document may be stored in numerous ways: in a file, in an XML Registry/Repository (such as the DB2 XRR(XML Registry/Repository)), or in a DB2 based UDDI Registry, for example. UDDI (Universal Description, Discovery, Integration) is a protocol for describing Web services such that interested parties may easily discover them. Specifications for this registry and use of WSDL in the registry are available currently at http://www.uddi.org/. Service providers may register their services in a UDDI, specifying technical information about how to invoke the service. IBM operates a publicly available UDDI service using DB2 and WebSphere.

Databases are computerized information storage and retrieval systems. A Relational Database Management System (RDBMS) is a database management system (DBMS) which uses relational techniques for storing and retrieving data. A DBMS is structured to accept commands to store, retrieve, and delete data. One widely used and well known set of commands is called the Structured Query Language (SQL). Relational databases are organized into tables which consist of rows and columns of data. The rows are formally called tuples. A database will typically have many tables and each table will typically have multiple tuples and multiple columns. The tables are typically stored on direct access storage devices (DASD) such as magnetic or optical disk drives for semi-permanent storage.

In a web services environment, a number of advantages would be obtained by integrating web services into a database, and to enable simple invocation of those web services. One advantage is efficient set-oriented processing and parallel execution of web service invocations. Another advantage is that users could easily combine web service transactions and information with data residing in the database. A further advantage would be realized by automatically generating a database mechanism for invoking a web service to enable integration of the web service into the database.

A further advantage would be provided by exposing the data and appropriate processes of a database (e.g., stored procedures and user-defined functions) as web services.

SUMMARY OF THE INVENTION

The present invention provides the desired capabilities as a method, system and program product for automatically generating an invocation mechanism for an external web service from a web service description, thereby facilitating integration of the web service into a database such that the service may be easily invoked from the database. Preferably, the service is a web service available over the internet The service may be invoked from any of a number of invoking mechanisms of the database. In a first specific embodiment, the mechanism comprises a user-defined function within an SQL statement. In a second specific embodiment, the mechanism comprises a virtual table. In a third specific embodiment, the mechanism comprises a stored procedure. In a fourth specific embodiment, the mechanism comprises a trigger. In a fifth specific embodiment, the mechanism comprises a federated table accessed via a nickname and implemented using a wrapper.

BRIEF DESCRIPTION OF THE DRAWING

A more complete understanding of the present invention may be obtained from a consideration of the following description when read in conjunction with the accompanying drawing in which:

FIG. 5 depicts a document access definition extension file;

FIG. 9 represents steps for executing a user-defined function for invoking a web service.

DETAILED DESCRIPTION

Figure 1:
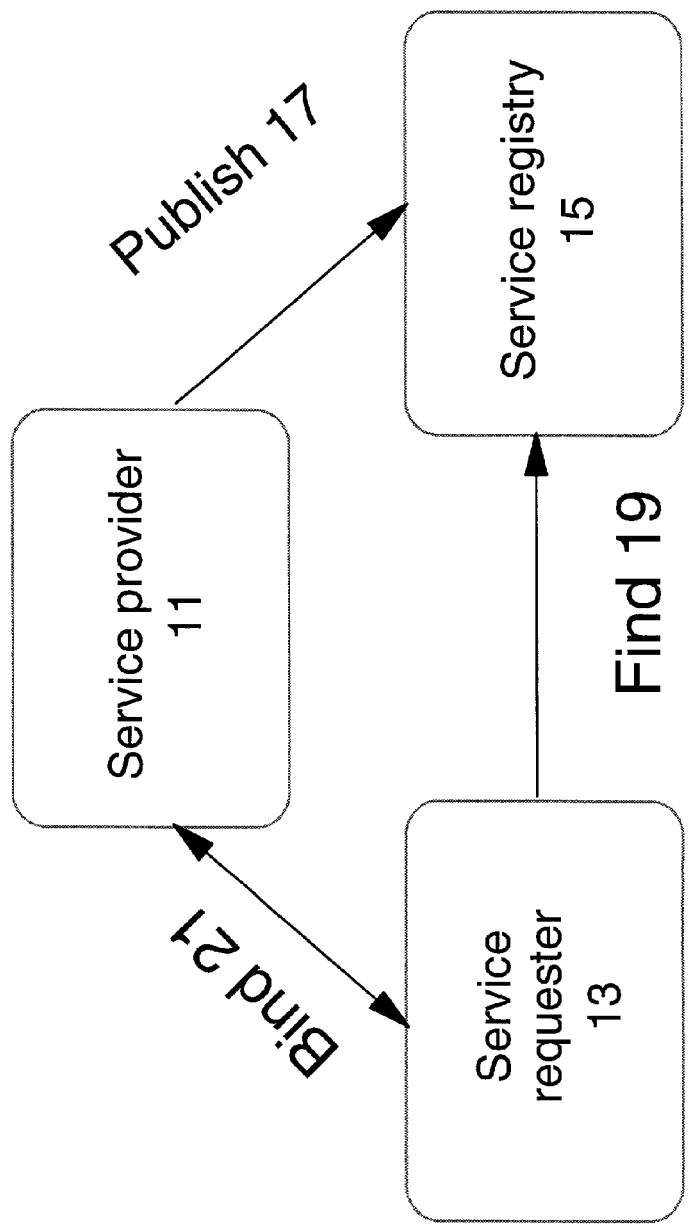
FIG. 1 depicts a services-oriented architecture.

Although the invention will be described with reference to a specific embodiment, it will be understood by the reader that the following description is merely illustrative of the principles of the invention and that other embodiments may be devised by those skilled in the art without departing from the spirit and scope of the invention. The described invention may be implemented in software, hardware, or a combination thereof. Software embodying the invention may be contained in a program product, e.g., tape, CD-ROM, floppy diskette, computer memory or direct access storage device.
Web Services Fundamentals The nature of Web services make them natural components in a service-oriented architecture. A typical service-oriented architecture is shown in FIG. 1. Service providers 11 host a network accessible software module. A service provider defines a service description for a Web service and publishes it to a service registry 13, as depicted by arrow 17. A service requester 15 at a client computer uses a find operation, represented by arrow 19, to retrieve the service description from the registry 13 and uses the service description to bind with the service provider, as represented by connector 21, and to invoke or interact with the Web service implementation. To facilitate this architecture, the client is connected to a router (not shown) at the service provider's server. Preferably, the connection between the client computer and the router is established via the Internet, but other connections can be used. It can be appreciated that the client computer connects to the Internet via telephone modem, cable modem, LAN, WAN, T1 or any other means well known in the art.

Figure 2:
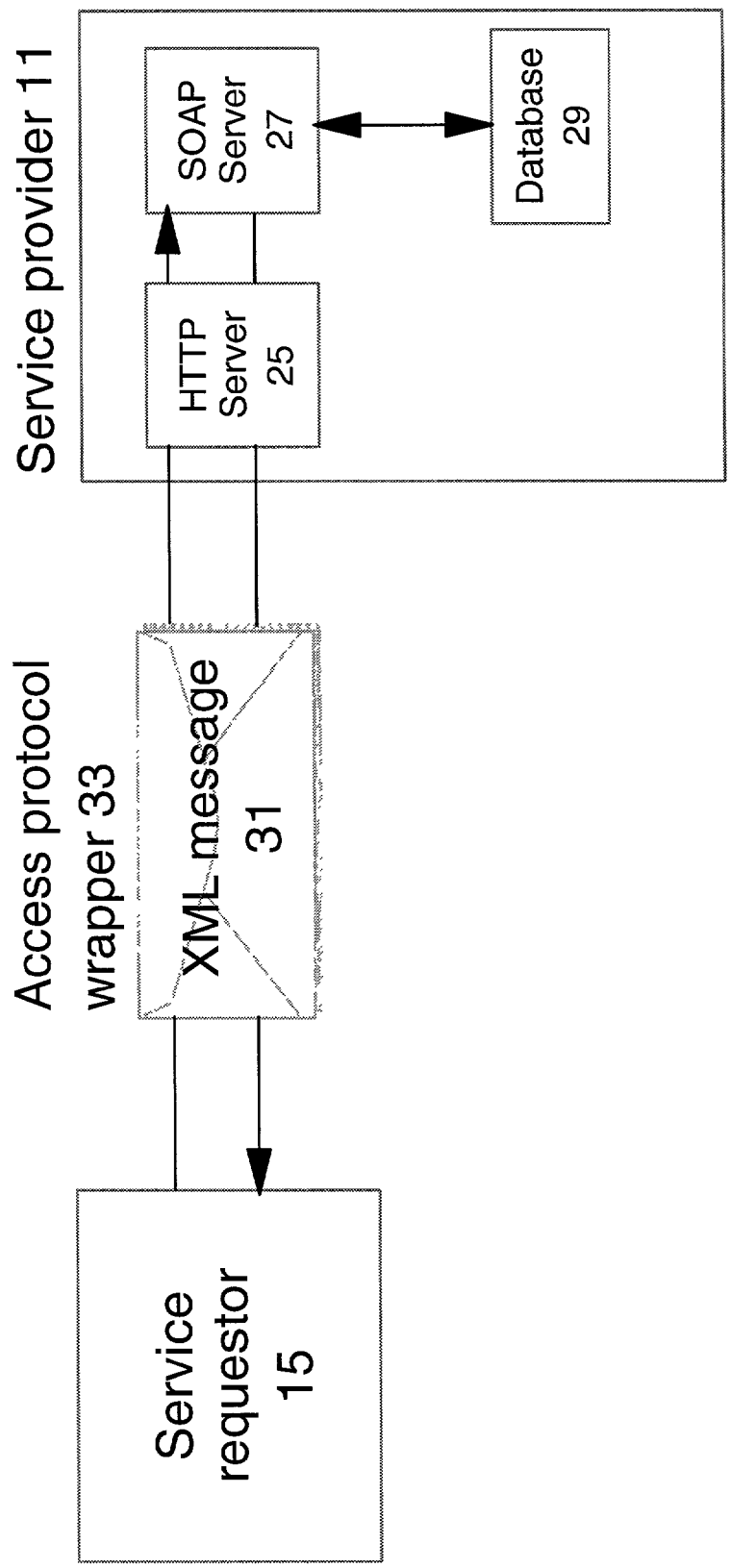
FIG. 2 represents a web service invocation or response transferred as a wrapped XML message between a service provider and a service requestor.

Applying the preceding model to web services and referring to FIG. 2, a service provider 11 makes an application available over the web as a Web service by wrapping the application in such a way that it can be accessed using standard XML messages, i.e., application-specific messages 31 are sent in standard XML document formats conforming to the corresponding service description. The XML messages 31 are themselves placed in a wrapper 33 in such a way that masks the underlying transport protocol. For example, an application message is placed in an XML wrapper by an XML extender administrative servlet (DXX admin servlet, not shown) included in the router at the service provider's database 29. XML messages 31 are then wrapped in Simple Object Access Protocol (SOAP) envelopes 33 at SOAP server 27 and posted to the web via HTTP server 25.

The DXX admin servlet configures at least one DXX invoker, which in turn can access at least one document access definition extension (DADx) file. The DADx file, in turn, can access one or more document access definition (DAD) files.

DXX is a collection of stored procedures, user defined types (UDTs), and user defined functions (UDFs) that are typically used in programs written in SQL, Java, C++, and other languages. The DXX invoker handles universal resource locators (URLs) having the extensions ".dadx" that reference web services and ".dtd" that reference document type definition (DTD) documents. Specifically, the DXX invoker provides runtime support for invoking DADx documents as web services written, e.g., in Apache Simple Object Access Protocol (SOAP). The servlet of the router connects to a database at invocation times. Preferably, this connection is established by a Java database connection (JDBC).

In one possible embodiment, the DXX Invoker, a Java component, interfaces with Apache SOAP 2.1 runtime using a pluggable provider support. A web application developer creates an instance of the DXX Invoker for each database that is to be accessed. Each instance of the DXX Invoker is associated with a database connection and a set of DADx files. The DXX Admin servlet is provided to simplify the task of creating instances of the DXX Invoker. Specifically, the DXX Admin servlet provides a web user interface for configuring instances of the DXX Invoker. Someone, e.g., a database administrator, sets up the databases and enables them for use by DXX. The service provider creates DAD and DADx documents and deploys them to the web application. Each DADx document is associated with a URL that identifies a specific web service.

As previously noted, SOAP is an application invocation protocol developed by IBM, Microsoft, and others that defines a simple protocol for exchanging information encoded as XML messages 31. SOAP is in the process of being more formally specified by the World Wide Web Consortium (W3C) as XML Protocol. The beauty of SOAP is that it makes no assumptions on the implementation of the endpoints. This means that a service requester 15 needs only to create an XML request, send it to a service provider 11, and understand the XML response that comes back.

A SOAP request 33 consists of the envelope itself, which contains the namespaces used by the rest of the SOAP message, an optional header, and the body, which may be a remote procedure call (RPC) or an XML document. SOAP builds on existing Internet standards such as HTTP and XML, but can be used with any network protocol, programming language, or data encoding model. For example, it is possible to send SOAP messages over IBM MQSeries®, FTP or even as mail messages.

The logical interface and the service implementation are described by the Web Services Description Language (WSDL). WSDL is an XML vocabulary used to automate the details involved in communicating between Web services applications. There are three pieces to WSDL: a data type description (XML schema), an interface description, and binding information. The interface description is typically used at development time and the binding information may be used at either development or execution time to actually invoke a particular service at the specified location. The service description is key to making the Web services architecture loosely coupled and reducing the amount of required shared understanding and custom programming between service providers and service requesters. As previously noted, the WSDL description is stored in a WSDL document. This WSDL document may be stored in numerous ways: in a file, in a DB2 XML Registry/Repository, or in a DB2 based UDDI Registry, for example.

Referring back to FIG. 1, the service can be publicized by being registered in a standard-format web registry 13. This registry makes it possible for other people or applications to find and use the service. For example, one can publish descriptive information, such as taxonomy, ownership, business name, business type and so on, via a registry that adheres to the Uniform Description, Discovery and Integration (UDDI) specification or into some other XML registry. The UDDI information can include a pointer to WSDL interfaces, the binding information, and a business name (the name that makes the purpose of the Web service understandable to humans). A UDDI registry is searchable by programs, enabling a service requester to bind to a UDDI provider to find out more information about a service before actually using it.

The ability to compose Web services together is provided, for example, by Web Services Flow Language (WSFL), another specification defined by IBM and others. WSFL can be used to describe a business process (that is, an execution flow from beginning to end), or a description of overall interactions between varying Web services with no specified sequence. It is more fully described in the WSDL V1.0 specification available at http://www-4.ibm.com/software/solutions/webservices/pdf/WSFL.pdf, (Referenced as Appendix C) appended hereto and incorporated herein by reference. The mechanism for creating a WSFL description is described in an article at Http://www-106.ibm.com/developerworks/webservices/library/ws-ref4/, (Referenced as Appendix D) appended hereto and incorporated by reference.

Looking at how all of these specifications work together, a Web service can be defined as a modular application that can be:
  Described using WSDL
  Published using UDDI
  Found using UDDI
  Bound using SOAP (or HTTP GET/POST)
  Invoked using SOAP (or HTTP GET/POST)
  Composed with other services into new services using WSFL Access to Web services may be restricted much as one would restrict access to Web sites that are not available to everyone. For example, IBM WebSphere® provides many options for controlling access and for authentication. The standards for this are still emerging. Microsoft and IBM have proposed a SOAP security extension to the W3C as the mechanism for XML digital signatures. The SOAP security extension included with WebSphere Application Server 4.0 is intended to be a security architecture based on the SOAP Security specification, and on widely-accepted security technologies such as secure socket layer (SSL). When using HTTP as the transport mechanism, there are different ways to combine HTTP basic authentication, SSL, and SOAP signatures to handle varying needs of security and authentication.

Accessing DB2 Data through Web Services

IBM is enabling its key programming models and application servers with Web services and is providing and developing tools to automatically generate Web services from existing artifacts such as Java Beans, EJBs, and stored procedures. The following types of web service operations are provided: XML-based query or storage, wherein an XML document is decomposed for storage in DB2 relational tables and composed again on retrieval; and SQL-based operations, such as calling stored procedures, or inserting, updating, deleting DB2 data.

Figure 3:
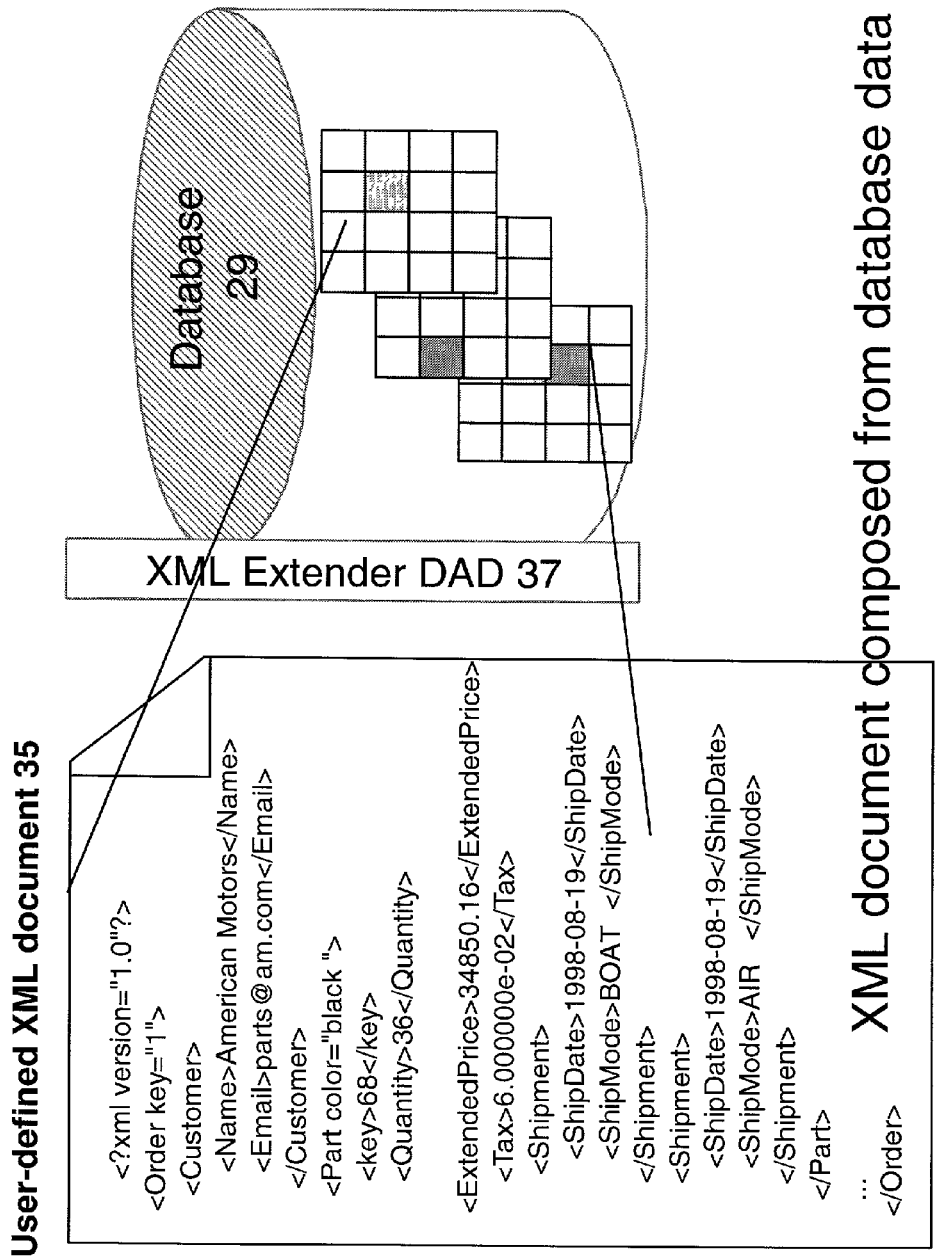
FIG. 3 represents an XML document composed from data in stored in a relational database and a document access definition.

XML-based query: Referring now to FIG. 3, XML-based querying permits composition of XML documents 35 from relational data stored in tables 38 of a database 29. One may also break an XML document 35 down into its component parts and store it into relational tables 38 of the database 29. Part of the underlying support for this functionality is provided by DB2 XML Extender. The store and retrieve operations are handled by special stored procedures that are shipped with DB2 XML Extender.

One of the inputs into both storage and retrieval is the user-specified mapping file 37 that creates the association between relational data and XML document structure. This mapping file 37 is called a Document Access Definition (DAD) 37 and provides a way to create an XML document 35 and specify the XML elements, attributes and shape desired. The focus of this approach is in moving and manipulating XML documents.

Figure 4:
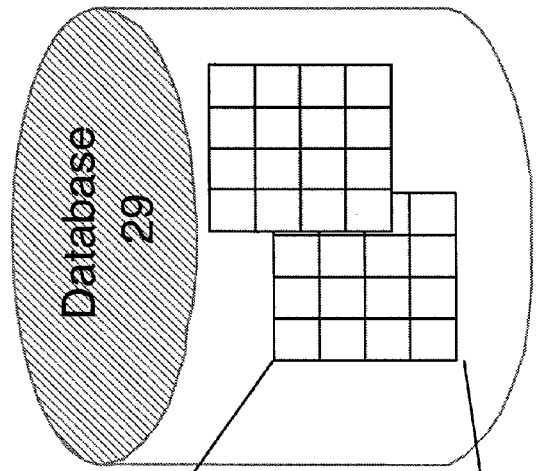
FIG. 4 represents relational data reformatted into an XML document using default tagging.
Figure 6:
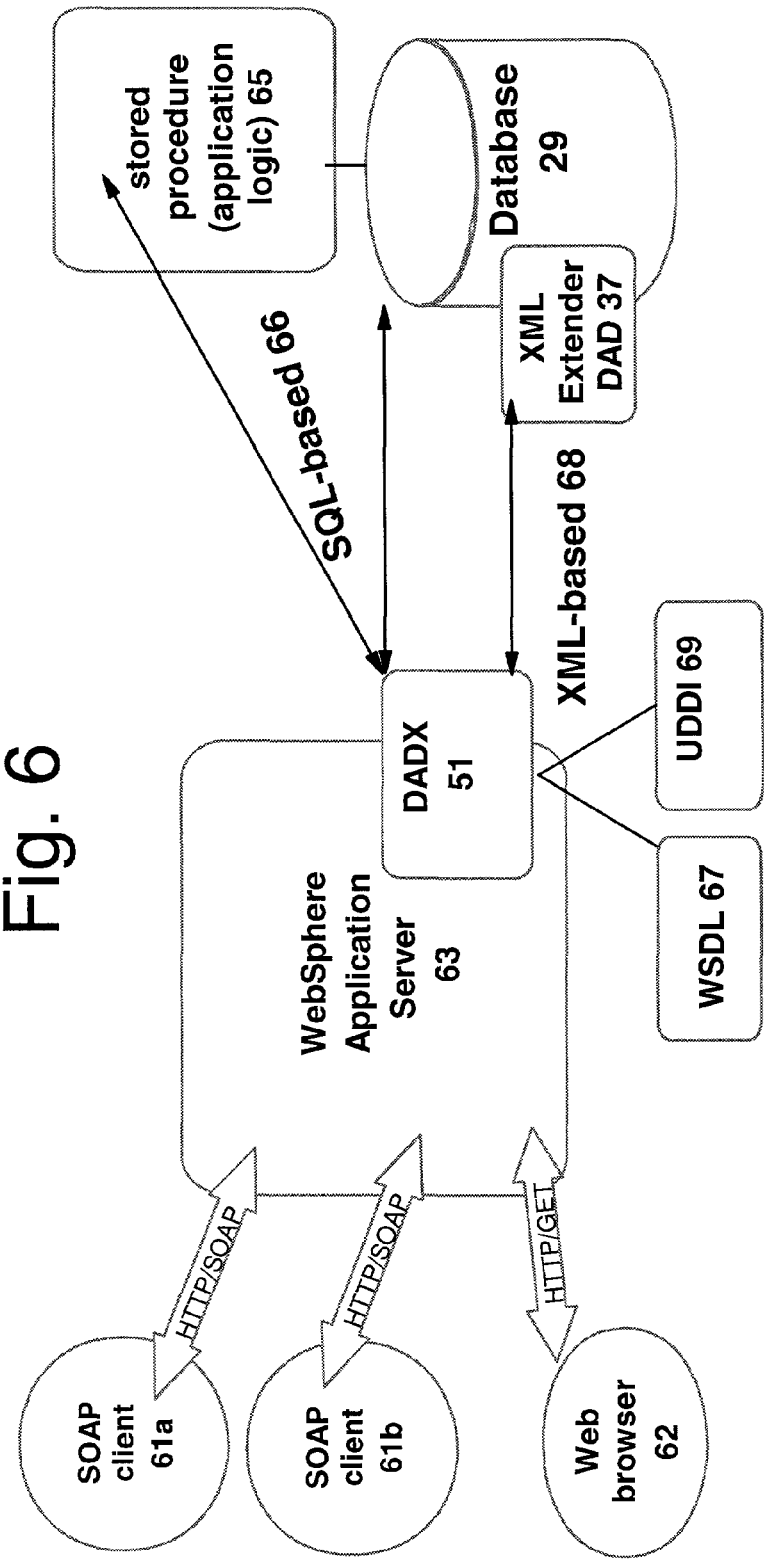
FIG. 6 depicts a web services architecture.

SQL-based query: Referring now to FIG. 4, SQL-based querying is simply the ability to send SQL statements, including stored procedure calls, to the database 29 and to return results with a default tagging 39.

The focus of this approach is actually the data in and out of the database 29, not on shaping the results in a particular way. SQL-based query does not require the use of an XML Extender because there is no user-defined mapping of SQL data to XML elements and attributes. Instead, the data is returned using only a simple mapping of SQL data types, using column names as elements.

However, if one is using DB2 XML Extender to store XML documents within a single column of a table, one may use SQL-based queries to retrieve those documents intact as a character large object (CLOB), or to invoke the user-defined functions that extract parts of the document. Another feature of DB2 XML Extender is the ability to store frequently-accessed data in side tables, thereby enabling speedy searches on XML documents that are stored in columns.

Another useful thing one may do with SQL-based query is to invoke DB2 stored procedures. Stored procedures are natural for conversion to Web services since they are themselves an encapsulation of programming logic and database access. A Web service invocation of a stored procedure makes it possible to dynamically provide input parameters and to retrieve results.

Both the XML-based and SQL-based forms of querying are controlled by the DADX, a configuration file shown in FIG. 5. The DADX configuration file defines the operations that can be performed by the Web service. For example, one might have a DADX file that specifies the operations to find all orders for parts, find all orders for parts with a particular color, and orders for parts that are above a certain specified price. The color or price can be specified at runtime as input parameters by using host-variable style notation in the query.

Use of DADX or similar mechanisms has enabled the development of a tool that automatically generates the WSDL description of the interfaces and publishes the interfaces to a UDDI registry or some other service directory. The tool also generates the artifacts needed to deploy the Web service into a web development tool such as WebSphere, and the client proxies that may be utilized for testing and as a basis for building the client part of one's Web application.

To help with the configuration task, a database connection configuration servlet is also provided. This servlet provides a Web-based interface to guide a user through the task of configuring database connections. One may have many DADX files that use the same database configuration.

Invoking Web Services from a Database

A database both manages data and provides intelligent access to it. Optimized queries, complex analysis, and efficient execution of business logic may all be provided by the database engine. The database can be viewed as an efficient and powerful set-oriented execution engine that typically works on locally managed data. Indeed, the set-oriented processing of DB2 can be used to operate on more than just locally managed data. DB2

Relational Connect allows remote, heterogeneous relational databases to be treated as local resources. DB2 also provides features built-in to SQL that enable external applications and systems to be manipulated in a set-oriented manner.

According to the present invention, a database can invoke a web service by representing the remote web service as a virtual table or function residing on the database. The virtual table may then be manipulated within an SQL statement. The mechanisms proposed for representing the remote web service according to the preferred embodiment are a user-defined function (UDF) contained within an SQL statement, a stored procedures (SP) containing calls or SQL statements to invoke the web service, or a wrapper created around the web service and providing the machinery for communicating with the external web service.

Invocation with User-Defined Functions/Virtual Tables.

User defined functions (UDFs) are a powerful SQL mechanism enabling users to define new operators to SQL that return either a single value or that return a tabular value. This UDF mechanism may be used to invoke external applications and to return virtual tables of data back to DB2.

Figure 7:
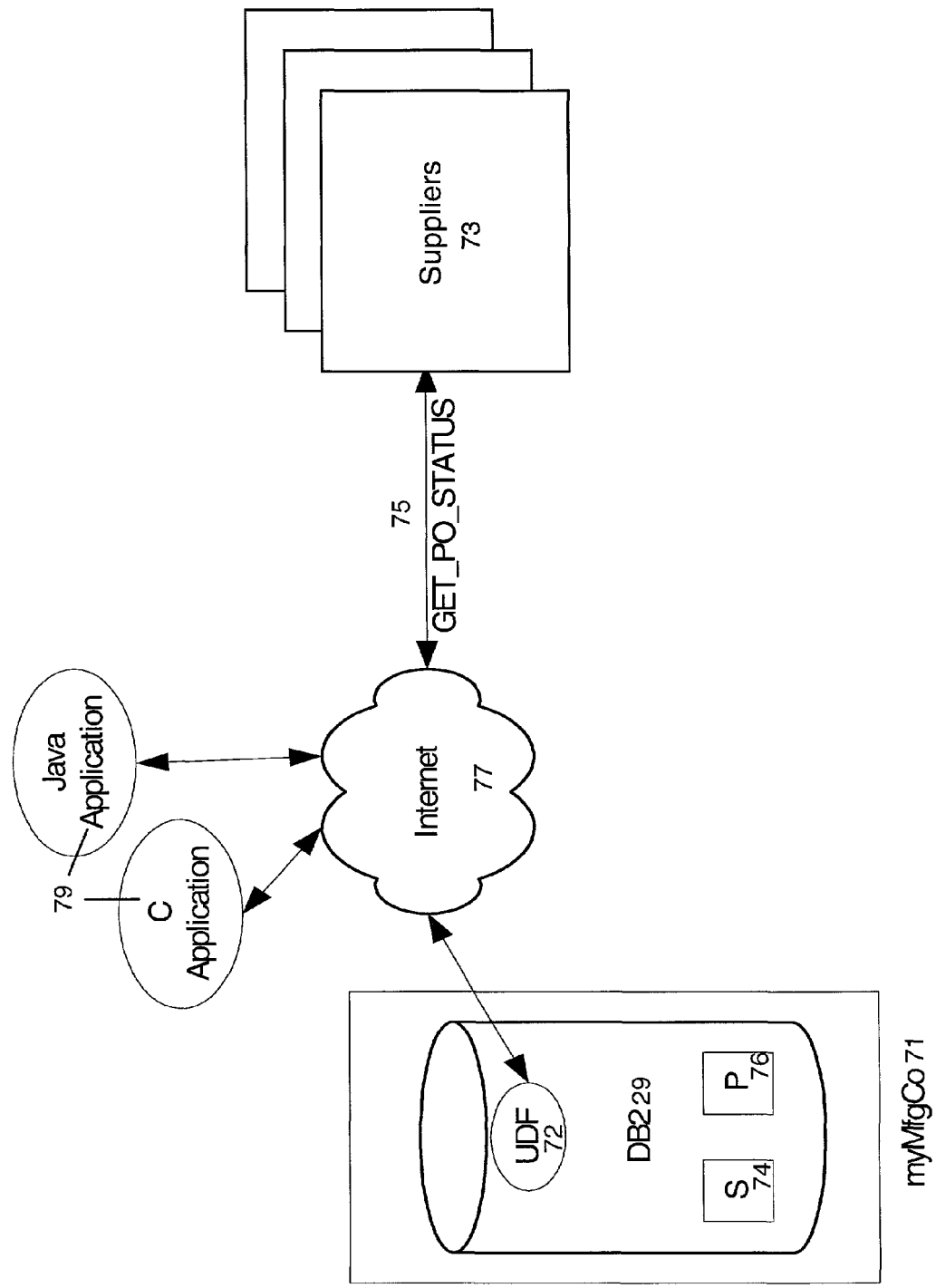
FIG. 7 represents a web services architecture facilitating invocation of a web service by a database.

FIG. 7 represents an exemplary system comprising a manufacturing company, myMfgCo 71, that works with a number of suppliers 73 around the world over the internet 77. The supplier systems comprise, for example, mainframes, Unix-based systems, laptops, etc. The manufacturing company 71 wishes to know the status of outstanding orders that it has placed. It therefore asks the suppliers 73 to provide it with a set of Web service interfaces, represented diagramatically in FIG. 7 with flow arrow 75, for facilitating the retrieval of desired information over the internet 77. The manufacturing company 71 further requests a web service for returning the status of a purchase order. Logically, the service may be invoked as follows:

ex 1: string GET_PO_STATUS(string URL, string PO_NUM)

The preceding function is implemented as a very simple Web service by the suppliers 73 according to emerging web service protocols. Implementing the function as a Web service allows it to be easily invoked by a wide variety of clients.

The invoking application may execute, for example, on a Unix-based system, a laptop, a mainframe, a browser or a Java application 79. However, according to the present invention the manufacturer 71 preferably invokes the application from within its database 29. Invocation is accomplished from a DB2 database with a user-defined function (UDF) 72 having the following signature:

ex 2: varchar(20) GET_PO STATUS (URL varchar(80), PO_NUM varchar(20))

Here the return value is the PO status and the input parameters are the URL to which the request is to be sent and the identity of the purchase order whose status is of interest. To find the status of a specific purchase order, e.g., "12345", at a supplier 73 that offers this service at http://www.Asupplier.com/GET_PO_STATUS, the following SQL statement is issued:

ex 3: values GET_PO_STATUS('http://www.Asupplier.com/GET_PO_STATUS','12345')

Now assume that the manufacturer 71 has a table 74 filled with outstanding purchase orders and another 76 containing information about the web service operations each supplier offers. Such tables might look like:

| PURCHASE_ORDERS | | | |
|---|---|---|---|
| Customer | Supplier | PO_NUM | O_NUM |
| C1 | ASupplier | 12345 | a456 |
| C1 | BSupplier | 12347 | b456 |
| C3 | BSupplier | 34656 | d435 |

| SUPPLIER_OPS | | |
|---|---|---|
| Supplier | Operation | URL |
| ASupplier | GET_PO_STATUS | http://www.Asupplier.com/GET_PO_STATUS |
| ASupplier | GET_QUOTE | http://www.Asupplier.com/GET_QUOTE |
| Bsupplier | GET_QUOTE | http://www.Bsupplier.com/services/GET_QUOTE |
| BSupplier | GET_PO_STATUS | http://www.Bsupplier.com/services/GET_PO_STATUS |

To find out the status of outstanding purchase orders from ASupplier for all of the manufacturer's customers, the following SQL is issued:

ex 4: select Customer, PO_NUM,
  GET_PO_STATUS('http://www.ASupplier.com/
  GET_PO_STATUS.jsp',PO) as
  PO_STATUS from PURCHASE_ORDERS where Supplier =
  'ASupplier'

In the forgoing example, the address of the service to be invoked is explicitly stated. It is more likely that the manufacturer 71 would like to find the status of all outstanding purchase orders from all suppliers 73 offering a web service interface. This is achieved by replacing the web address with a parameter, e.g.:

ex 5: select P.Supplier, P.PO_NUM, GET_PO_STATUS(P.PO, S.Service_Address) as
  PO_STATUS from PURCHASE_ORDERS P, SUPPLIER_OPS S where P.Supplier =
  S.Supplier and S.operation = 'GET_PO_STATUS'

Alternatively, one may query the UDDI or other registry directly rather than having to maintain a Supplier-Ops table. For example, the UDDI can be browsed for web services that satisfy the required information, and those web services of interest may be incorporated into the select statement. Or, the manufacturer 71 may require suppliers 73 to name their web services with a pre-determined name and then query the registry for the name directly in the query.

A further aspect of the invention, described subsequently, a tool may be used to automatically generate a user-defined function from the WSDL definition of a web service for use in the SQL query.

For convenience, the query of example 5, above may be represented as an output table or "view" to provide a simpler interface:

```
ex 6: create view order_status as
        select o.customer, o.po_num, o.supplier,
            get_po_status(s.URL, o.po_num) as status
```

| RFQ | | | |
|---|---|---|---|
| Inputs | part_num string | qty iInteger | desired_date date |
| Outputs | price decimal | proposed_date date | | ex 9: RFQ inputs: String part_num, Integer qty, Date desired_delivery_date
      outputs: Decimal price, Date proposed_delivery_date This service may be made accessible to DB2 by turning it into a DB2 Table Function, i.e., by creating a virtual table representative of the web service. Other relational database products may provide similar mechanisms for creating a virtual table. The DB2 Table function has the following parameters:

| GET_Quote | | | | | | | |
|---|---|---|---|---|---|---|---|
| Inputs | supplier varchar(30) | URL varchar(80) | part_num varchar(20) | qty iInteger | desired_date date | | |
| Outputs | supplier varchar(30) | URL varchar(80) | part_num varchar(20) | qty iInteger | desired_date date | price decimal | currency varchar(10) | proposed_date date |

-continued

```
from purchase_orders o, supplier_ops s
    where o.supplier = s.supplier and s.operation =
        'GET_PO_STATUS'
ex 7: select * from order_status
```

This query may be extended to exploit features of SQL. For instance, to sort the result by supplier and purchase order status one simply appends an order by clause such as:

```
ex 8: select Customer, Supplier, PO_NUM,
        GET_PO_STATUS(P.PO, S.Service_Address) as
        PO_STATUS
    from order_status
    order by Supplier
```

All the examples so far show how a web service that returns a single value can be integrated with DB2 SQL, but how are multiple return values handled? Assume that the manufacturing company 11, excited by the power of such a simple Web service as GET_PO_STATUS, now convinces its suppliers 73 to implement a service to respond to quotation requests (RFQs). This RFQ Web service would have the following signature:

To provide more meaningful context, the table function includes as outputs all of the interesting input parameters. The Get_Quote table function is invoked inside of a query such as:

```
ex 10: Select * from table (Get_Quote ( 'ASupplier',
        'http://www.Asupplier.com/GET_QUOTE', '52435FFA',25,
        '7/1/2001') t
```

This statement will return back a table containing a single row with the response from this supplier. But what if the manufacturing company 71 dealt with suppliers in other countries? The Get_Quote function contains the currency units, so it would be an easily matter to convert the price to dollars. Now to perform the conversion one could, of course, try to manually maintain a table of currency conversion data—but given the volatile nature of foreign exchange, it would be better to invoke another Web service, perhaps provided by a foreign exchange trading firm, to perform this conversion for us using up to the minute information. The DB2 function to invoke this service will be:

To_Dollars: inputs (Currency varchar(10), amount decimal) outputs (amount decimal)

Using this additional service, one may obtain a more accurate quote using a query such as:

```
ex 11: Select t.supplier, t.part_num, t.qty, (t.desired_date -
        t.proposed_date) as timeliness, to_dollars(t.currency, t.price) as cost
    from table (Get_Quote ( 'ASupplier', 'http://www.Asupplier.com/GET_QUOTE',
        '52435FFA',25, '7/1/2001') t
```

In the preceding example the columns have been explicitly stated and, using the power of SQL, an output column named timeliness has been defined to reflect the deviation between the manufacturer's desired date and the date proposed by the supplier 73 for the part. The currency conversion web service, to_dollars, has been utilized to convert the quoted price to U.S. currency. This query will return a single row with the quote from a single vendor for a single part. What if the manufacturer 11 had a list of needed parts that it wished to get quotes on? A table called NEEDED_PARTS is defined for this purpose:

| NEEDED_PARTS | | |
|---|---|---|
| part_num | qty | desired_date |
| 34dsaf | 20 | Jul. 1, 2001 |
| 35gfds | 34 | Aug. 1, 2001 |
| 809gds | 10 | Jun. 30, 2001 |

Now to get quotes on all of these parts from ASupplier, the following SQL is issued:

```
ex 12: Select t.supplier, n.part_num, n.qty, (n.desired_date -
    t.proposed_date) as timeliness, to_dollars(t.currency, t.price) from
    needed_parts n, table (Get_Quote ( 'ASupplier',
    'http://www.Asupplier.com/GET_QUOTE', n.part_num, n.qty, n.desired_date) t
```

This query returns a table of quotes for each part listed in the NEEDED_PARTS table from Asupplier. But what the manufacturer 11 wanted to get quotes for each of its suppliers? To do so, the following query is issued:

```
ex 13: Select n.part_num, t.supplier, n.qty, (n.desired_date -
    t.proposed_date) as timeliness, to_dollars(t.currency, t.price) from
    needed_parts n, supplier_ops s, table (Get_Quote ( s.supplier,
    s.URL, n.part_num, n.qty, n.desired_date) t
    where s.operation = 'GET_QUOTE'
    order by n.part_num, timeliness
```

So the above query generates quotes for all the needed parts from all the suppliers that offer the GET_QUOTE Web service and returns a table of these quotes ordered by part number and timeliness. Very powerful, yet simple, standard DB2 SQL.

Finally, the manufacturer 11 may want to expose this query as a Web service itself so that its purchasing agents can invoke the query from wherever they are as long as they have access to the internet. DB2 7.2 with the XML Extender provides a simple mechanism that allows Web services to be created in support of such queries. The extender allows stored procedures and SQL statements to be exposed as invokable Web service operations, as is described more fully in http://www.ibm.com/software/data/db2/extenders/xmlext, (Referenced as Appendix E) appended hereto and incorporated by reference herein. Any catalogued stored procedure may be exposed. The operation signature includes the input and output parameters and will also return one or more stored procedure result sets as an XML document.

To summarize, the preceding example illustrates how Web services may be integrated into DB2 SQL as User Defined Functions. Once Web services can be invoked as UDFs one can leverage the full power of SQL to perform queries across combinations of Web services and persistent data.

Additional invocation mechanisms available for integrating a web service into a database are described below.

Invoking a Web Service through a Stored Procedure

In a third specific embodiment, the mechanism for invoking a web service is a stored procedure. Stored procedures are well-known in the art of relational databases. A stored procedure is invoked by a call, e.g., from a database client, e.g., a command line processor, a JDBC client, another stored procedure, a static c program or embedded SQL application. The stored procedure invokes a web service with, for example, an embedded java class or an SQL statement containing an invocation of the service, e.g., through a UDF or table function, or through any of a number of common client interfaces to web services known to those skilled in the art. For example, creation of Java classes to invoke web services is described in the IBM web services toolkit.

Invoking a Web Service with a Trigger Function

In a fourth specific embodiment, the mechanism for invoking a web service comprises a trigger. Triggers are well-known in the art of relational databases. A trigger is invoked by a triggering event, e.g., a table state change such as inserting a row into a table. The trigger invokes the web service with a call to the web service, or an SQL statement containing an invocation of the service, e.g., through a UDF or table function.

Wrapping a Web Service Within the Database

In a fifth specific embodiment, the mechanism comprises a federated table accessed via a nickname and implemented using a wrapper. Such federated tables are known to those skilled in the art of federated databases. The federated table looks like a local table to the database. The wrapper, e.g., a DB2 Relational Connect wrapper, provides the machinery for invoking the external service and receiving the response back.

Generating a UDF from WSDL

As a further aspect of the invention, a unique tool is provided for generating user defined functions (UDFs) from web services defined by the WSDL (Web Services Definition Language) notation. These UDFs may then be invoked through standard SQL statements. Used in conjunction with UDDI and the XML Registry/Repository, this means that a user may easily locate useful web services using UDDI, retrieve descriptions of these web services using UDDI and/or XRR and then extend a database with access to these web services by using this tool to generate UDFs.

The steps preformed by the UDF generator are described below, with reference to FIG. 8. A user browses a UDDI or other registry for a desired web service, e.g., a web service that will return the current exchange rate to US dollars from a given currency. This step is represented as step a) in FIG. 8 and may be executed, for example, using an XML query wrapped as a SOAP request. The web service description is returned, for example, as an XML document.

Figure 8:
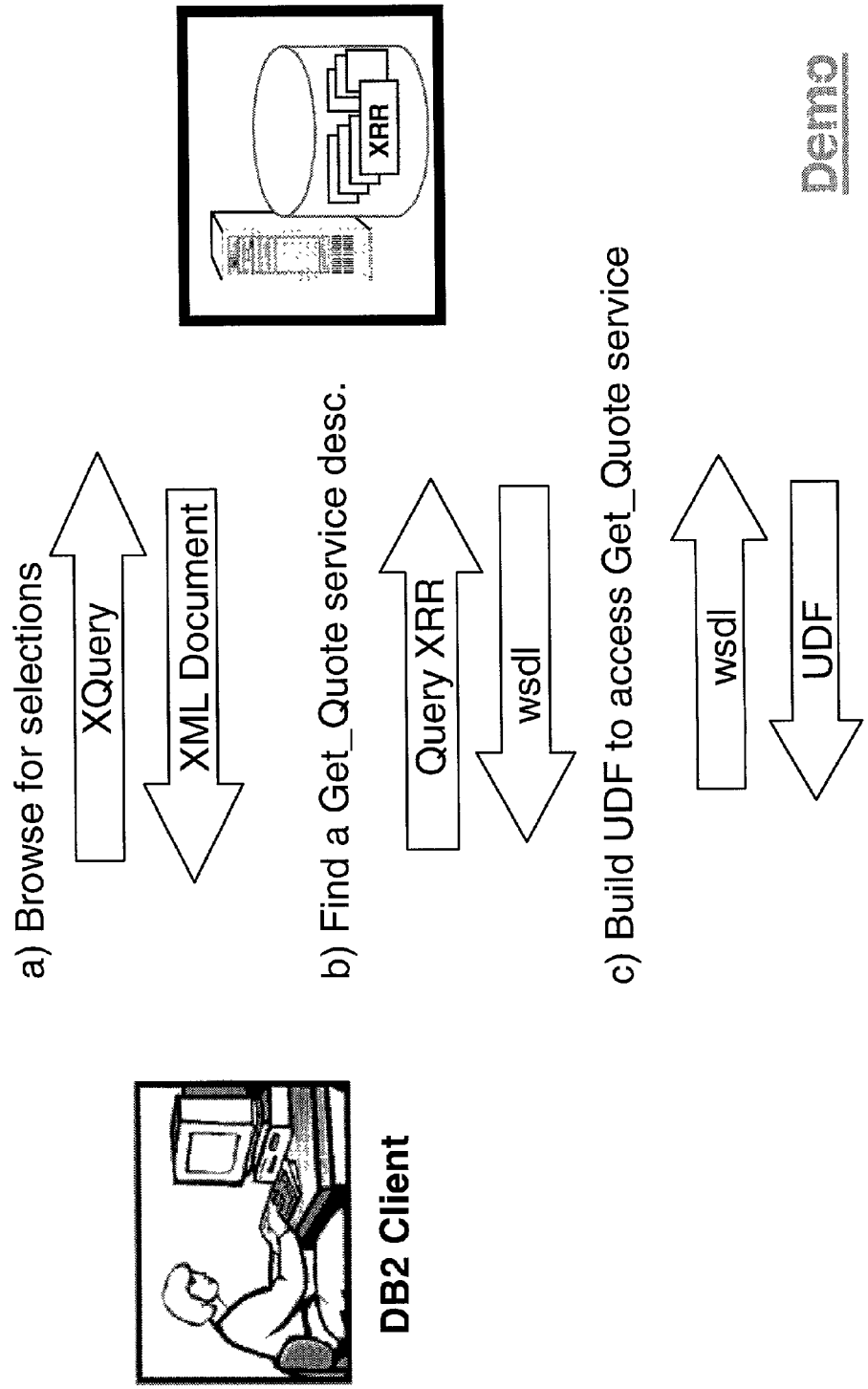
FIG. 8 represents the steps for creating a user-defined function for invoking a web service.

The user then issues a query to XRR or UDDI to find the name of the WSDL file that implements this web service, as shown in FIG. 8 by step b). The contents of the WSDL file of the present example are:

```
<?xml version = "1.0"?>
    <definitions name = "CurrencyExchangeService" targetNamespace =
"http://www.xmethods.net/sd/CurrencyExchangeService.wsdl"
xmlns:tns="http://www.xmethods.net/sd/CurrencyExchangeService.wsdl"
```

-continued

```
xmlns:xsd =
"http://www.w3.org/2001/XMLSchema" xmlns:soap =
"http://schemas.xmlsoap.org/wsdl/soap/"
xmlns = "http://schemas.xmlsoap.org/wsdl/">
        <message name = "getRateRequest">
            <part name = "country1" type = "xsd:string"/>
            <part name = "country2" type = "xsd:string"/>
        </message>
        <message name = "getRateResponse">
            <part name = "Result" type = "xsd:float"/>
        </message>
        <portType name = "CurrencyExchangePortType">
            <operation name = "getRate">
                <input message = "tns:getRateRequest" />
                <output message = "tns:getRateResponse" />
            </operation>
        </portType>
        <binding name = "CurrencyExchangeBinding" type =
"tns:CurrencyExchangePortType">
            <soap:binding style = "rpc" transport =
"http://schemas.xmlsoap.org/soap/http"/>
            <operation name = "getRate">
                <soap:operation soapAction=""/>
                <input >
                    <soap:body use = "encoded" namespace =
"urn:xmethods-CurrencyExchange" encodingStyle =
"http://schemas.xmlsoap.org/soap/encoding/"/>
                </input>
                <output >
                    <soap:body use = "encoded" namespace =
"urn:xmethods-CurrencyExchange" encodingStyle =
"http://schemas.xmlsoap.org/soap/encoding/"/>
                </output>
            </operation>
        </binding>
        <service name = "CurrencyExchangeService">
            <documentation>Returns the exchange rate between the two
currencies</documentation>
            <port name = "CurrencyExchangePort" binding =
"tns:CurrencyExchangeBinding">
                <soap:address location =
                "http://services.xmethods.net:80/soap"/>
            </port>
        </service>
    </definitions>
```

A simple form of the command is executed with the following:

wsUDFGenerator—in http://www.xmethods.net/sd/CurrencyExchangeService.wsdl

This command will result in an SQL script file called CurrencyExchangeService.SQL that contains the definition and implementation of a user-defined function to invoke the currency exchange web service.

Optionally, the user may then query the UDDI or other repository to determine all suppliers who offer the identified web service, as shown in step a) of FIG. 9. For example, the user may issue an SQL query to the remote UDDI and receive tuples containing information about the suppliers. As represented by the forward arrow in step b) of FIG. 9, the UDF may then be invoked within standard SQL statements such as the following:

values getRate('UK','USA')

select item, (price * getRate( country, 'USA')) as cost from purchase_orders

In addition to creating scalar functions such as above, one may also create table functions where the invocation of the web service yields a table of one or more rows, as represented by the backward arrow in step b) of FIG. 9. For instance, assume that there is a web service that returns status about commercial flights. Using the UDF generating tool one may generate a table function getFlightinfo that returns a table containing the airline, flight number, location, speed, altitude and equipement. The following query illustrates how this may be used:

select t.airline, t.flightNumber, t.currentLocation, t.altitude, t.speed, t.equipment from table (getFlightInfo('AA', '88')) t Of course, once a table function is created, it may be utilized in a variety of ways. For instance, one may return the status of a set of flights, combine this information from other tables and web services, and store information about this flight in a table.

The constructed UDFs make use of general Web Service invocation functions. A general function to invoke HTTP based Web Services, soaphttp, accepts as input parameters the URL of the web service provider, the name of the web service and the name of the particular operation or method to be performed in addition to a string containing the input parameters. The function returns the a single string containing the result of the invocation.

The following example shows an invocation of a very simple web service that accepts a single input parameter (country) and returns a single output parameter.

```
Values soaphttp('http://services.xmethods.net:80/soap',
                'urn:xmethods-CurrencyExchange',
                'getRate',
                'UK')
```

Most web services are more complex with multiple input and output parameters, often with complex structures. The web service UDF generator creates the code to construct the input parameters and parse the result into one or more values.

In the examples above, the tool is shown to create UDFs that invoke the web service from a particular provider. Often, a web service will be defined such that it may be implemented by multiple providers. For instance if a company worked with its suppliers to develop a standard web service interfaces to get the order status of outstanding orders, one might want to invoke the same UDF implementing the web service request against many different web service providers, perhaps even in the same statement. The tool currently allows you to specify that a UDF be generated to support this by allowing an additional parameter containing the location of the service provider to be passed at execution time. For example, if we had a table containing the names of suppliers and the URL of the po_status web service they implement then we could issue the following query:

select p.po_number, po_status(p.po-number, s.url), s.supplier from purchase_orders p, suppliers s where p.supplier=s.supplier This query invokes the po status web service for each row in the purchase orders table sending each request to the appropriate supplier service.

Figure 10:
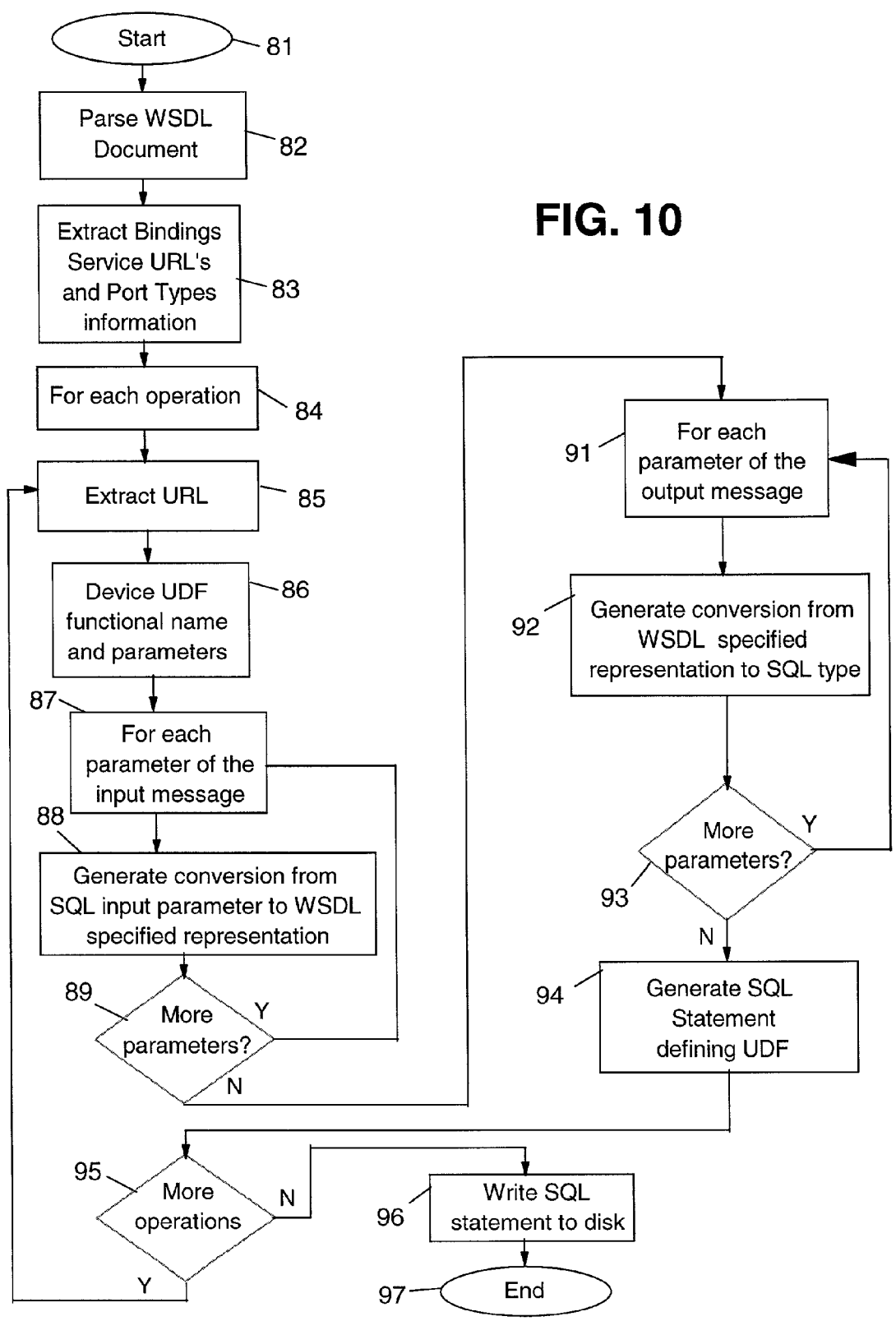
FIG. 10 is a flow diagram depicting the steps of a specific embodiment for generating a UDF from a WSDL document.

FIG. 10 illustrates the steps for creating a UDF from WSDL once the WSDL description has been retrieved from a registry. The starting point of the sequence is represented by block 81. In a first step 82, the WSDL document is parsed. In a next step 83, the bindings, URL's and port types information is extracted from the parsed content of the document. A loop is then initiated at step 84. For each operation contained in the web service description, a URI is extracted 85 and a user-defined function is derived 86, including a name and input parameters. Then a nested loop is initiated at step 87 for each input parameter of the input message, wherein each SQL input parameter is converted to a WSDL-specified representation at step 88 until it is determined at decision diamond 89 that there are no more parameters to convert. Next, another nested loop is initiated at step 91, wherein each output parameter of the output message is converted to a WSDL-specified representation from an SQL type at step 92 until it is determined that the output parameters have been exhausted at decision diamond 93. Next, an SQL statement defining the UDF is generated at step 94. The preceding steps of the operations loop are repeated until it is determined that all operations have been exhausted at decision diamond 95. Finally, the SQL statement is stored on nonvolatile memory in step 96 and the procedure ends, as represented by block 97.

Conclusion

In conclusion, a system, method and program product have been described for invoking a web service from within a database by representing the web service as an artifact local to the database. In addition, a tool has been described for automatically generating a user-defined function from a standard description of a web service, for use in invoking the web service from a database.

What is claims is:

1. A computer implemented method for enabling invocation of an external service at a service provider server from a database in a database computer system, comprising:
   accessing from over a network a published description of the external service published by the service provider external to the database, wherein the published description includes a definition defining operations performed by the external service in a service description language, wherein the database manages data and includes a database engine to perform queries;
   parsing the accessed published description to determine one of the operations contained in the published description;
   deriving a user defined function name for one of the determined operations from the accessed published description of the external service;
   generating a conversion between a database language statement and the service description language for the determined operation;
   generating database language statements defining the user defined function executable by the database to invoke the external service, wherein the user defined function resides on the database;
   invoking, by the database, the user defined function by executing the database language statements including the user defined function within the database to invoke the external service and perform a query with respect to the external service, wherein the user defined function invokes the external service by accepting as input parameters a network address of the external service, a name of the external service, and a name of an operation to be performed; and
   receiving, at the database, data from the external service in response to invoking and interacting with the external service, wherein the user defined function returns the result of the invocation.

2. The method of claim 1, wherein the external service further comprises a web service.

3. The method of claim 1, wherein the service description language comprises Web Services Description Language (WSDL).

4. The method of claim 1, wherein the published description is retrieved over the network from a registry.

5. The method of claim 4, wherein the network comprises the Internet.

6. The method of claim 5, wherein the published description is retrieved with a Simple Object Access Protocol (SOAP) request.

7. The method of claim 4, wherein the registry comprises a standardized registry.

8. The method of claim 7, wherein the registry comprises a Universal Description, Discovery, Integration (UDDI registry).

9. The method of claim 4, wherein the registry is local to the database.

10. The method of claim 1, wherein the invoked user defined function returns the data from the external service to the database as a virtual table.

11. The method of claim 1, wherein generating the user defined function comprises:
    for each operation contained in the published description of the external service, determining a network address of the operation and generating a user defined function for the operation having a name and input parameters.

12. The method of claim 1, wherein the generated user defined function accepts as a parameter containing a location of the service provider, wherein the user defined function invokes the external service at multiple service providers by specifying the location of the each service provider when invoking an instance of the user defined function for each service provider.

13. The method of claim 1, wherein the external service comprises a web service, and wherein accessing the published description of the external service comprises:
    browsing a registry to determine a web service; and
    issuing a query to access a file that includes code implementing the determined web service, wherein the accessed published description from which the user defined function is generated comprises the accessed file.

14. The method of claim 13, wherein the user defined function includes a name of a method to be performed within the web service.

15. The method of claim 1, further comprising:
    obtaining at least one service provider implementing the external service, wherein the generated user defined function is coded to invoke the external service against the at least one service provider at execution time.

16. The method of claim 1, wherein the generating the conversion for the determined operation further comprises:
    for each parameter of an input message in the external service, generating a conversion of an input parameter in the database language statements to an input parameter in the service description language; and
    for each parameter of an output message in the external service, generating a conversion of an output parameter from the service description language to the external service to a representation of an input parameter in the database language statements.

17. A program product comprising a non-transitory computer readable storage medium containing instructions executable by a computer coupled to a network, the instructions executed to perform invocation of an external service at a service provider server from a computer database system, comprising:
    accessing from over a network a published description of the external service published by the service provider external to the database, wherein the published description includes a definition defining operations performed by the external service in a service description language, wherein the database manages data and includes a database engine to perform queries;

parsing the accessed published description to determine one of the operations contained in the published description;

deriving a user defined function name for one of the determined operations from the accessed published description of the external service;

generating a conversion between a database language statement and the service description language for the determined operation;

generating database language statements defining the user defined function executable by the database to invoke the external service, wherein the user defined function resides on the database;

invoking, by the database, the user defined function by executing the database language statements including the user defined function within the database to invoke the external service and perform a query with respect to the external service, wherein the user defined function invokes the external service by accepting as input parameters a network address of the external service, a name of the external service, and a name of an operation to be performed; and receiving, at the database, data from the external service in response to invoking and interacting with the external service, wherein the user defined function returns the result of the invocation.

18. The program product of claim 17, wherein the external service further comprises a web service.

19. The program product of claim 17, wherein the service description language comprises Web Services Description Language (WSDL).

20. The program product of claim 17, wherein the published description is retrieved over the network from a registry.

21. The program product of claim 20, wherein the network comprises the Internet.

22. The program product of claim 21, wherein the published description is retrieved with a Simple Object Access Protocol (SOAP) request.

23. The program product of claim 20, wherein the registry comprises a standardized registry.

24. The program product of claim 23, wherein the registry comprises a Universal Description, Discovery, Integration (UDDI registry).

25. The program product of claim 20, wherein the registry is local to the database.

26. The program product of claim 17, wherein the invoked user defined function returns the data from the external service to the database as a virtual table.

27. The program product of claim 17, wherein generating the user defined function comprises:
for each operation contained in the public description of the external service, determining a network address of the operation and generating a user defined function for the operation having a name and input parameters.

28. The program product of claim 17, wherein the generated user defined function accepts as a parameter containing a location of the service provider, wherein the user defined function invokes the external service at multiple service providers by specifying the location of the each service provider when invoking an instance of the user defined function for each service provider.

29. The program product of claim 17, wherein the external service comprises a web service, and wherein accessing the published description of the external service comprises:

browsing a registry to determine a web service; and issuing a query to access a file that includes code implementing the determined web service, wherein the accessed published description from which the user defined function is generated comprises the accessed file.

30. The program product of claim 29, wherein the user defined function includes a name of a method to be performed within the web service.

31. The program product of claim 17, further comprising:
obtaining at least one service provider implementing the external service, wherein the generated user defined function is coded to invoke the external service against the at least one service provider at execution time.

32. The program product of claim 17, wherein the generating the conversion for the determined operation further comprises:

for each parameter of an input message in the external service, generating a conversion of an input parameter in the database language statements to an input parameter in the service description language; and for each parameter of an output message in the external service, generating a conversion of an output parameter from the service description language to the external service to a representation of an input parameter in the database language statements.

33. A system, including a computer and computer storage device, for invoking an external service at a service provider server from a database, comprising:

a database;

a service requester accessing from over a network a published description of the external service published by the service provider external to the database, wherein the published description includes a definition defining operations performed by the external service in a service description language, wherein the database manages data and includes a database engine to perform queries;

a generator generating a user defined function from the accessed published description of the external service by performing:

parsing the accessed published description to determine one of the operations contained in the published description;

deriving a user defined function name for one of the determined operations from the accessed published description of the external service;

generating a conversion between a database language statement and the service description language for the determined operation;

generating database language statements defining the user defined function executable by the database to invoke the external service, wherein the user defined function resides on the database;

wherein the database performs:

invoking the user defined function by executing the database language statements including the user defined function within the database to invoke the external service and perform a query with respect to the external service, wherein the user defined function invokes the external service by accepting as input parameters a network address of the external service, a name of the external service, and a name of an operation to be performed; and receiving, at the database, data from the external service in response to invoking and interacting with the external service, wherein the user defined function returns the result of the invocation.

34. The system of claim 33, wherein the external service further comprises a web service.

35. The system of claim 33, wherein the service description language comprises Web Services Description Language (WSDL).

36. The system of claim 33, wherein the published description is retrieved over the network from a registry.

37. The system of claim 36, wherein the network comprises the Internet.

38. The system of claim 37, wherein the published description is retrieved with a Simple Object Access Protocol (system) request.

39. The system of claim 36, wherein the registry comprises a standardized registry.

40. The system of claim 39, wherein the registry comprises a Universal Description, Discovery, Integration (UDDI registry).

41. The system of claim 36, wherein the registry is local to the database.

42. The system of claim 33, wherein the invoked user defined function returns the data from the external service to the database as a virtual table.

43. The system of claim 33, wherein generating the user defined function comprises:
for each operation contained in the published description of the external service, determining a network address of the operation and generating a user defined function for the operation having a name and input parameters.

44. The system of claim 33, wherein the generated user defined function accepts as a parameter containing a location of the service provider, wherein the user defined function invokes the external service at multiple service providers by specifying the location of the each service provider when invoking an instance of the user defined function for each service provider.

45. The system of claim 33, wherein the external service comprises a web service, and wherein accessing the published description of the external service comprises:
browsing a registry to determine a web service; and
issuing a query to access a file that includes code implementing the determined web service, wherein the accessed published description from which the user defined function is generated comprises the accessed file.

46. The system of claim 45, wherein the user defined function includes a name of a method to be performed within the web service.

47. The system of claim 33, wherein the service requestor further performs:
obtaining at least one service provider implementing the external service, wherein the generated user defined function is coded to invoke the external service against the at least one service provider at execution time.

48. The system of claim 33, wherein the generating the conversion for the determined operation further comprises:
for each parameter of an input message in the external service, generating a conversion of an input parameter in the database language statements to an input parameter in the service description language; and
for each parameter of an output message in the external service, generating a conversion of an output parameter from the service description language to the external service to a representation of an input parameter in the database language statements.

* * * * *